United States Patent [19]

Reeves et al.

[11] 4,174,381
[45] Nov. 13, 1979

[54] CHLORINE AND IRON OXIDE FROM FERRIC CHLORIDE—PROCESS AND APPARATUS

[75] Inventors: James W. Reeves; Robert W. Sylvester, both of Wilmington, Del.; David F. Wells, Avondale, Pa.

[73] Assignee: E. I. Du Pont de Nemours & Co., Wilmington, Del.

[21] Appl. No.: 899,696

[22] Filed: Apr. 24, 1978

[51] Int. Cl.$^2$ .............................................. C01B 7/03
[52] U.S. Cl. ..................................... 423/502; 423/633
[58] Field of Search ....................... 423/500, 502, 633

[56] References Cited

U.S. PATENT DOCUMENTS

| 2,642,339 | 6/1953 | Sawyer ................................. 423/502 |
| 3,793,444 | 2/1974 | Reeves et al. ......................... 423/502 |

OTHER PUBLICATIONS

Alfred Weiss, Ed., "World Mining & Metals Technology", The Society of Mining Engineers, Aug. 1976, pp. 693–712.

Primary Examiner—Earl C. Thomas

[57] ABSTRACT

An improved industrial process and apparatus are provided for producing chlorine and iron oxide in a multi-stage recirculating-fluidized-bed reactor wherein ferric chloride in the vapor phase is reacted with an excess of oxygen at temperatures from 550° to 800° C. The improvement comprises utilizing a reactor that includes an initial "dense" zone and a downstream "dilute" zone. In the dense zone, a fuel is burned, reactants and recirculated iron oxide particles are heated, ferric chloride is vaporized and at least 50% of the ferric chloride is converted to chlorine and iron oxide. A solids volume fraction from 0.3 to 0.6 and a superficial gas velocity from 0.15 to 0.6 meters/second are maintained in the dense zone. In the downstream dilute zone, a solids fraction from 0.005 to 0.05 is maintained, along with a superficial gas velocity from 1.5 to 6 meters/second which is from 5 to 25 times the superficial gas velocity in the dense zone, and the conversion of ferric chloride is continued to greater than 95% completion.

4 Claims, 3 Drawing Figures

CHLORINE AND IRON OXIDE FROM FERRIC CHLORIDE—PROCESS AND APPARATUS

BACKGROUND OF THE INVENTION

1. Field of the Invention

This invention concerns an improved process and apparatus for producing chlorine and iron oxide from iron chlorides. More particularly, it concerns such a process and apparatus wherein the ferric chloride is treated in the vapor phase with oxygen in a multistage recirculating-fluidized-bed reactor.

2. Prior Art

Several industrial processes, such as the direct chlorination of ilmenite ores to produce titanium dioxide, generate large quantities of by-product iron chlorides. Disposal of these iron chlorides poses potential pollution problems and represents an economic loss for the chlorine contained in the iron chlorides.

A multistage recirculating-fluidized-bed reactor, in which iron chlorides are converted to chlorine and iron oxide, is suggested by Reeves et al., U.S. Pat. No. 3,793,444. The reactor is divided into zones by foraminous members, which have a plurality of holes through which gas and particulate matter flow. Each zone operates with an upward superficial gas velocity in the range of 0.2 to 2 feet/second [0.06 to 0.6 meters/second] and contains a dense fluidized mass of bed particles containing iron oxide. Reeves et al. discloses a reactor in which the zones are of equal cross-sectional dimensions, as well as a reactor in which the cross-sectional dimensions are increased from zone to zone as one proceeds form the inlet to the outlet of the reactor. Entrained solids exiting the reactor are pneumatically conveyed to downstream equipment for separating the gases from the solids and recycling a portion of the solids to the fluidized bed of the reactor. It has now been found that when such a reactor is operated on an industrial scale, the foraminous dividers provide undesired additional pressure drop in the system and have a tendency to become plugged.

Harris et al., "Process for Chlorination of Titanium Bearing Metals and for Dechlorination of Iron Chloride" in *World Mining and Metals Technology*, Alfred Weiss, e.d., The Society of Mining Engineers, New York, Chapter 44, pages 693–712, August, 1976, reports that the Bureau of Mines has been investigating a process in which ferric chloride in the vapor phase is treated with oxygen in a single-stage, dense fluidized-bed reactor. The process is described in greater detail by Paige et al., "Recovery of Chlorine and Iron Oxide from Ferric Chloride," Journal of Metals, pages 12–16 (November, 1975). In this process, preheated oxygen is fed to the bottom of a heating section which contains a dense fluidized bed of iron oxide and wherein an optional fuel may be burned. Ferric chloride is screw-fed to the top of the heating section which is connected to the bottom of the reaction zone. The reaction zone is of larger cross section than the heating zone. The ferric chloride is vaporized and then reacts with the oxygen as both pass through the dense fluidized-bed reaction zone of the reactor. Off-gases are passed from the reaction zone to a cyclone separator to remove any entrained solids. In a separated stream, a portion of the iron oxide bed material and product, which is collected at the bottom of the heating section, is treated with sodium chloride catalyst and then recycled to the reactor in an amount equal to about 25% by weight of the ferric chloride feed. The authors point out that this process operates satisfactorily on a laboratory scale, but that an industrial process for conversion of waste ferric chloride by dechlorination is still needed.

Although fluidized-bed reactors which operate with a dilute phase (e.g., with solids fraction below 0.05 and with superficial gas velocities of about 15 to 30 feet/second [4.5 to 9 meters/second] are known, such reactors have not been utilized for the conversion of iron chlorides to chlorine and iron oxide. We have found that such single-stage dilute-phase reactors would be inadequate for converting iron chlorides to chlorine and iron oxide on an industrial scale because of difficulties in supplying sufficient heat for maintaining reaction temperature control and in providing high conversions at high throughputs.

SUMMARY OF THE INVENTION

To overcome, or at least minimize the problems associated with the aforementioned prior-art processes and reactors, the present invention provides an improved process and apparatus for producing chlorine and iron oxide from iron chlorides. The process is of the type wherein a ferric chloride is treated in the vapor phase in a multistage recirculating-fluidized-bed reactor with an excess of oxygen in the presence of a catalyst made from sodium chloride and iron oxide. Superatmospheric pressure and a temperature from 550° to 800° C. are employed. A carbonaceous fuel is fed to the reactor to provide supplemental heat. The gaseous and solid materials flow cocurrently through the reactor. Bed material is recirculated to the reactor at a weight rate of 1 to 10 times the iron chloride feed rate. Gaseous and solid effluents from the reactor are separated and recovered downstream of the reactor. The improvement of the present invention comprises carrying out the above-described treatment in a reactor that includes:

(1) an initial dense zone having a length-to-diameter ratio, $(L/D)_1$, from 2:1 to 4:1, wherein a solids volume fraction, $S_1$, from 0.3 to 0.6 and a superficial gas velocity, $V_1$, from 0.15 to 0.6 meters/second are maintained and wherein the fuel is burned, the recirculated-bed material and reactants are heated, the ferric chloride is vaporized and oxidation of the ferric chloride is initiated, and (2) a downstream dilute zone having a length-to-diameter ratio, $(L/D)_4$, of at least 10:1 wherein a solids volume fraction, $S_4$, from 0.005 to 0.05 and a superficial gas velocity, $V_4$, from 1.5 to 6 meters/second, which velocity is from 4 to 25 times the superficial gas velocity in the dense zone and wherein the conversion of the ferric chloride is brought to at least 95% completion.

Preferred embodiments of the invention include a transition zone between the dense and dilute zones. A transition zone between the dense and dilute zone reduces the tendency for slugging, i.e., pulse flow of of solids. In one preferred embodiment, the transition zone comprises a constriction which is smaller in cross-sectional area than either the dense or dilute zones whereby the superficial gas velocity is 25 times the gas velocity in the dense zone. In a more preferred embodiment, the transition zone comprises a second zone that is connected to the outlet of the dense zone and leads to a third zone of enlarged cross section which in turn leads to the dilute zone; in the transition zone, the gas is accelerated in the second zone to a superficial velocity, $V_2$, from 2 to 6 meters/second and in the third zone, the gas and solid materials are decelerated so that a superficial gas velocity, $V_3$, is achieved from 0.25 to 1.2 meters/second, which velocity is 1.2 to 3.2 times the superficial gas velocity in the dense zone. In this case, the transition zone obviously increases the retention time of both gases and solids but, more importantly, increases the solids volume fraction without resulting in pulse flow of solids.

In one particularly preferred embodiment of the process of the present invention which includes a transition zone having a region of enlarged cross section, the initial dense zone has an (L/D) from 3:1 to 4:1, an $S_1$ from 0.36 to 0.48 and a $V_1$ from 0.3 to 0.45 meters/second, the dilute zone has an $S_4$ from 0.008 to 0.032 and $V_4$ from 3 to 4.5 meters/second, which is from 6 to 15 times $V_1$, and the third zone of the transition zone has a superficial gas velocity, $V_3$, from 0.3 to 0.75 meters/second, which is between 1.3 and 2 times $V_1$.

The present invention also provides improved reactors particularly suited for carrying out the conversion of iron chlorides to chlorine and iron oxide in accordance with the above-described process. The reactor is of the type which includes means for accepting feed materials and reactants, means for reacting said reactants in the presence of a fluidized bed and means for recycling a portion of the fluidized bed out of and back to the reactor. In one of the improved apparatuses of the present invention, the reactor has four successive zones comprising:

(1) a first zone provided by a generally cylindrical vessel with a conical bottom having inlets for feed materials and recycled bed material, a length-to-diameter ratio, $(L/D)_1$, from 2:1 to 4:1, and an outlet connected to (2) a second zone provided by a first conduit having a length-to-diameter ratio, $(L/D)_2$, from 1:1 to 15:1 and an outlet connected to (3) a third zone provided by a second conduit having a region of enlarged cross section and an outlet connected to (4) a fourth zone provided by a third conduit having a length-to-diameter ratio, $(L/D)_4$, of at least 10:1, the diameter of the vessel in the first zone being from 1.1 to 1.8 times the diameter of the enlarged cross section of the third zone and from 3 to 5 times the respective diameters of the second and fourth zones.

In a preferred embodiment of the improved apparatus of the invention, the enlarged region of the third zone has a length-to-diameter ratio, $(L/D)_3$, from 1:1 to 4:1 (most preferably from 1.5:1 to 3:1), $(L/D)_1$ is from 3:1 to 4:1, $(L/D)_2$ is from 5:1 to 10:1 and $(L/D)_4$ is less than 30:1 (most preferably from 10:1 and 20:1) and the vessel diameter of the first zone is from 1.2 and 1.5 times the diameter of the enlarged region of the third zone and from 3 to 4 times the respective diameter of the second and fourth zones.

In the second improved apparatus of the present invention, the reactor has three successive zones comprising:

(1) a first zone provided by a generally cylindrical vessel with a conical bottom having inlets for feed materials and recycled bed material, a length-to-diameter ratio, $(L/D)_1$, from 2:1 to 4:1, and an outlet connected to (2) a second zone provided by a narrow conduit having a length-to-diameter ratio, $(L/D)_5$, of at least 1:1 and an outlet connected to (3) a third zone provided by a larger conduit having a length-to-diameter ratio, $(L/D)_6$, of at least 10:1, the diameter of the larger conduit being from 1.5 to 3 times the diameter of the narrow conduit of the second zone, the diameter of the vessel in the first zone being from 5 to 10 times the diameter of the narrow conduit of the second zone and from 3 to 5 times the diameter of the larger conduit in the third zone.

All dimensions described herein refer to internal dimensions of the equipment as more particularly described hereinafter with reference to the drawings.

For use on an industrial scale, the process of the present invention can operate satisfactorily with iron chloride feed rates of greater than 2500 kilograms per hour and achieve over 95% conversion to chlorine and iron oxide. For such industrial-scale operation, the diameter of the vessel of the first zone (i.e., "dense" zone) of the reactor is usually at least 60 centimeters.

DETAILED DESCRIPTION OF THE INVENTION

In the practice of the present invention, the iron chloride feed material may be obtained from any of many different sources. Clearly, the feed can be chemically pure ferric chloride, but more importantly from an industrial viewpoint, the feed can be obtained in a mixture of by-products from an industrial plant, such as the by-product stream from an ilmenite chlorination process for manufacturing titania. A typical composition of such a by-product stream is as follows:

| Component | Percent by Weight |
|---|---|
| $FeCl_3$ | 87 |
| $FeCl_2$ | 5 |
| $TiCl_4$ | 3 |
| $AlCl_3$ | 2 |
| $MnCl_2$ | 2 |
| $MgCl_2$ | 0.6 |
| Miscellaneous | 0.4 |

A feed material of approximately this composition was used in the Examples given below.

In operation of the process of the present invention, the ferric chloride is vaporized and treated with an excess of oxygen to form gaseous chlorine and solid iron oxide. The chloride product can be recycled directly to an ilmenite chlorination process or recovered for other uses. Under the conditions of the present process, ferrous chloride in the iron chloride feed is converted to ferric chloride and then to ferric oxide product. The treatment of the ferric chloride with oxygen is carried out in the presence of fluidized particles of iron oxide that have been treated with sodium chloride to form a catalyst for the conversion of ferric chloride to ferric oxide. Iron oxide particles having an average size of 20–200 microns are suitable. The particle size of the iron oxide appears to be self-regulating because of attrition of the larger particles. A pulverized carbonaceous fuel is also fed to the reacting system in order to maintain stable reaction temperatures and to provide supplemental heat. The amount of oxygen fed is in excess of the stoichiometric amount required to convert all the iron chlorides in the feed to ferric oxide and all the carbon and hydrogen in the fuel to carbon dioxide and water, respectively. Preferably, the oxygen feed amounts from 103 to 170% of the stoichiometric amount, and most preferably from 110 to 125% of stoichiometric. In the reactor, the recirculation rate of the iron oxide particles of the fluidized bed can be varied over a wide range. Generally the bed material is recirculated at a weight rate of flow equal to between 1 and 10 times the iron chloride feed rate. Preferred recirculation rates are between 2 and 6 times the weight rate of iron chloride feed. Superatmospheric pressure, preferably from 3 to 10 atmospheres, and temperatures from 550° to 800° C., preferably 600° to 700° C., are employed.

Figure 1:
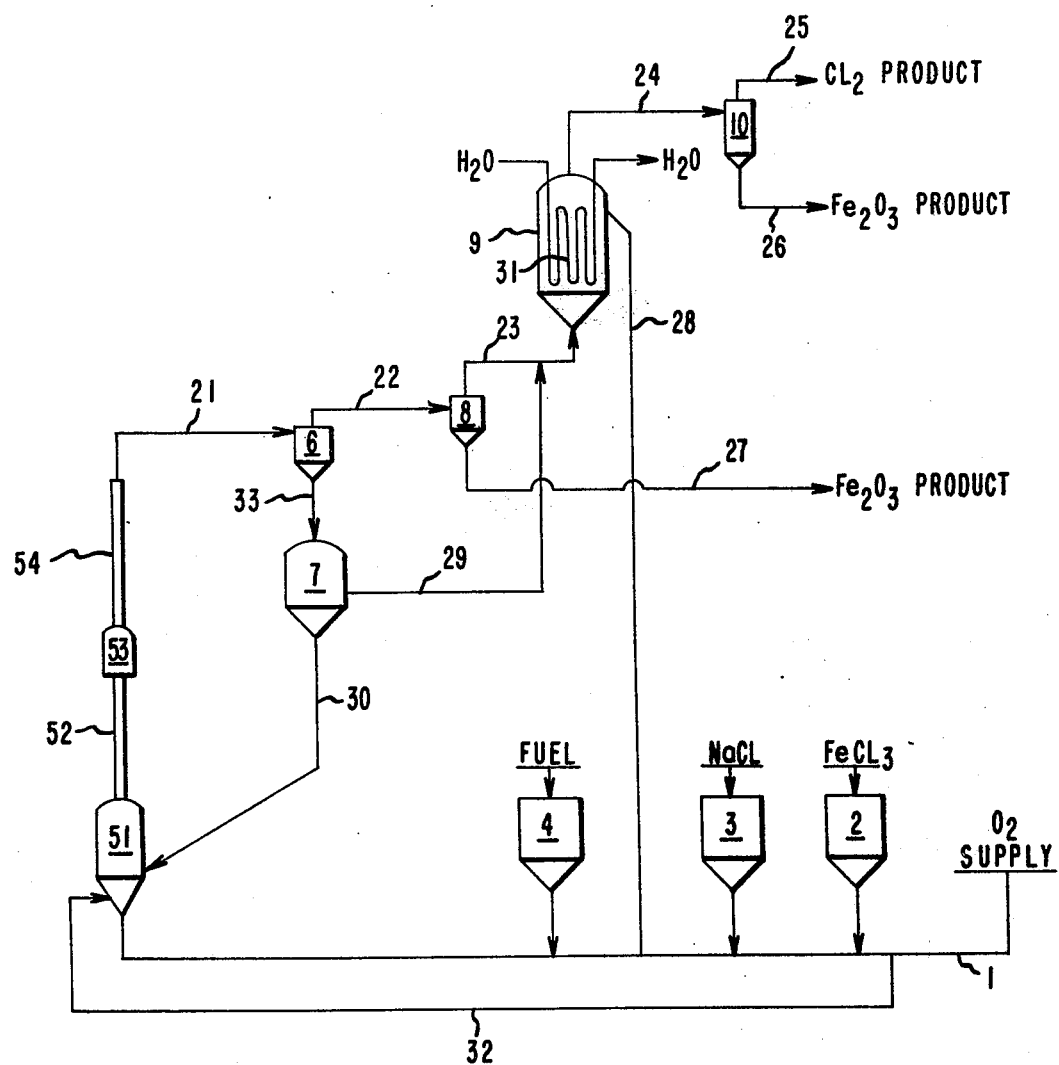
FIG. 1 depicts in schematic fashion a continuous process which embodies the present invention.

Suitable equipment for carrying out the present invention as a continuous process is depicted in FIG. 1.

As shown in FIG. 1, oxygen is fed to line 1. The oxygen, which is not heated, is supplied at a pressure of about 100 psig (6.8 atm). The size of line 1 is such that the oxygen feed is maintained at a sufficiently high velocity to permit transport of iron chloride, sodium chloride, pulverized fuel and recycle material fed to line 1 from pressurized storage vessels 2, 3 and 4 which are pressurized with a gas, for example $N_2$, and recycle line 28, respectively. The materials in the storage vessels are maintained dry. The oxygen and any gas which may exit from the pressurized storage vessels and the solid materials conveyed with the gas through line 1 enter the reactor, which comprises the equipment designated by numerals 51, 52, 53 and 54, through the bottom of reactor vessel 51.

As noted above, the reactor is divided into several sections. The first section, reactor vessel 51, into which the materials from line 1 enter, is ceramic-lined to an internal diameter of 2½ feet (76 cm) and has a height of 9.3 feet (2.85 m), including a height of 2 feet (0.61 m) for the conical bottom and 1.25 feet (0.38 ) for the hemispherical head. Four supplemental oxygen inlets, supplied through line 32, are located at about mid-height of the bottom conical portion of reactor vessel 51. The nozzles are spaced 90 degrees apart and inject oxygen radially into the center of the cone. Approximately 5 to 15% of the total oxygen fed to the reactor vessel is supplied through these nozzles. The fluidized-bed particles, reactants and products formed flow concurrently from reactor vessel 51 through first conduit 52, a ceramic-lined pipe, which measures 9 inches (22.9 cm) in inside diameter and about 6 feet (1.83 m) in length, into second conduit 53, ceramic-lined, which measures about 2 feet (61 cm) in inside diameter and 4 feet (1.22 m) in length. In pipe 52, because of the higher velocity of the stream, the solids concentration is lower than in reactor vessel 51. Second conduit 53, having an enlarged diameter, serves to reduce the velocity of the particles and acts as a mixer prior to the entry of the stream into third conduit 54, a ceramic-lined pipe, which is of the same diameter as pipe 52 and measures 28 feet (8.54 m) in length.

Within reactor vessel 51, the materials fed from line 1 are heated to temperatures in the range of 550° C. to 800° C.; ferric chloride is vaporized; the carbon is burned; and sodium chloride and ferric oxide form catalytic bed particles; this ferric chloride and oxygen react in reactor vessel 51 as well as in reactor sections 52, 53 and 54 to form chloride and ferric oxide product.

The stream exiting from reactor vessels 51, 52, 53 and 54 enters cyclone separator 6 from line 21. The difference in elevation between the top of reactor vessel 51 and the inlet to cyclone separator 6 is approximately 70 feet (21.3 m). In cyclone separator 6, coarse iron oxide particles are separated from the stream and deposited via line 33 in hot-solids storage tank 7 from which they are recycled via line 30 to the bottom of the cylindrical section of reactor vessel 51. The gaseous stream and fine iron oxide particles exiting cyclone separator 6 are transported via line 22 to cyclone separator 8 which operates at a higher separation efficiency than cyclone separator 6, and removes most of the remaining solids from the gaseous product stream. This gaseous product stream is then fed via line 23 to the bottom of fluid-bed condenser 9. The condenser is provided with water-cooled internal coils 31 which reduce the temperature in the condenser to about 150° C. In condenser 9, unreacted gaseous iron chloride is condensed onto a bed or iron oxide particles, which were fed to condenser 9 from hot-solids storage tank 7 via line 29 through line 23. The unreacted ferric chloride and iron oxide particles are returned to the reactor via line 28 through line 1.

The cooled pressurized gaseous product leaving fluid bed condenser 9 is fed via line 24 to final cyclone separator 10 to remove any remaining entrained solids. The gaseous product is primarily chlorine which can be recycled directly to an ilmenite chlorination process or can be collected for other uses.

Part of the iron oxide product is obtained from line 27; the remainder from line 26. It is possible to operate with cyclone separator 8 removed from the system, in which case, iron oxide product could be removed from a tap in reactor recycle line 30.

Figure 2:
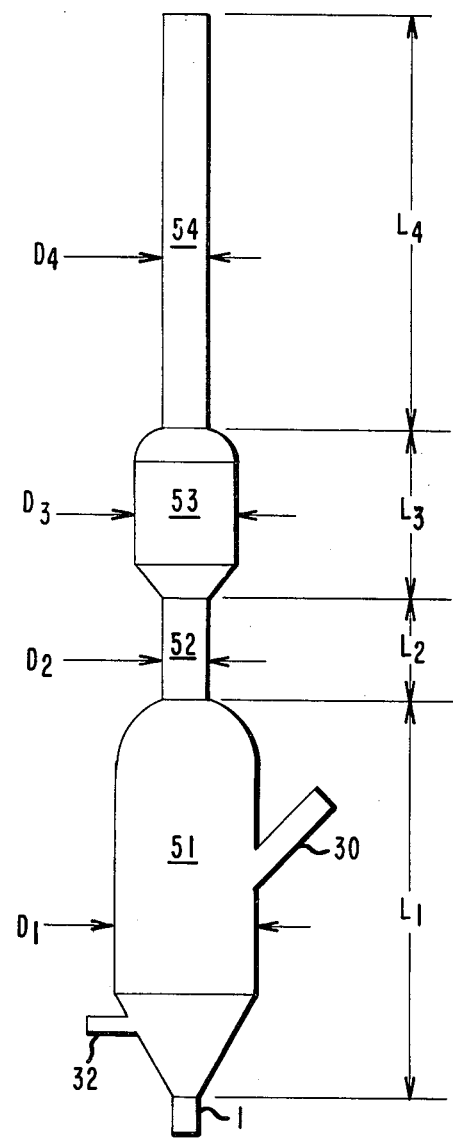
FIGS. 2 and 3 are schematic drawings, not to scale, of reactors of the present invention.

FIG. 2 schematically depicts one improved reactor of the invention wherein $D_1$ is the diameter of reactor vessel 51 in the first reaction zone and $L_1$ is the length of reactor vessel 51 in the first reaction zone; $D_2$ is the diameter of first conduit 52 in the second reaction zone and $L_2$ is the length of first conduit 52 in the second reaction zone; $D_3$ is the diameter of second conduit section 53 in the third reaction zone and $L_3$ is the length of second conduit 53 in the third reaction zone; and $D_4$ is the diameter of third conduit 54 in the fourth reaction zone and $L_4$ is the length of third conduit 54 in the fourth reaction zone. In the reactor of FIG. 2 the transition zone between the dense zone, or first zone, and the dilute zone, or fourth zone, consists of the first conduit 52 and enlarged second conduit 53. In practice first conduit 52 receives a fluctuating void fraction and nonuniform solids flow from the first or dense zone, i.e., vessel 51. As the solids flow onto enlarged second conduit 53 a shallow dense phase bed forms at the base of second conduit 53 and decelerates the rate of solids flow entering from first conduit 52 providing uniform solids dispersion above the dense phase region.

Figure 3:
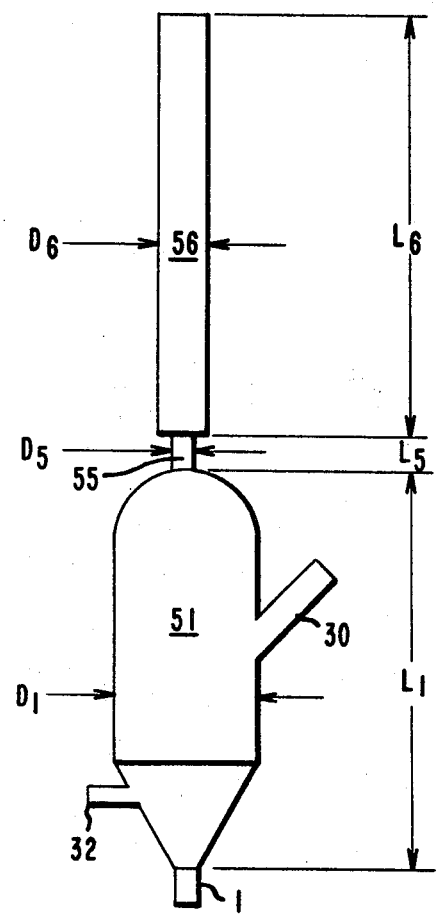

FIG. 3 schematically depicts a second improved reactor of the invention wherein $D_1$ is the diameter of reactor vessel 5 in the first reaction zone and $L_1$ is the length of reactor vessel 51 in the first reaction zone; $D_5$ is the diameter of the narrow conduit 55 in the second reaction zone and $L_5$ is the length of the narrow conduit in the second zone and conduit in the second reaction zone; and $D_6$ is the diameter of the larger conduit 56 in the third reaction zone and $L_6$ is the length of the larger conduit 56 in the third reaction zone. In the reactor of FIG. 3 the transition zone between the dense zone, or first zone, and the dilute zone, or third zone, consists of the narrow conduit 55. In practice the fluctuating, nonuniform solids flow from reactor vessel 51 is dispersed into larger conduit 56 to form a dilute phase. In larger conduit 56 the high velocity solids gradually decelerate without bubble formation, but with some back mixing in the upper section of larger conduit 56. The apparatus of FIG. 3 can be utilized in place of the apparatus of FIG. 2 in the continuous process of FIG. 1.

The following start-up procedure has been found satisfactory for the above-described system. The reactor system (51, 52, 53 and 54), the first cyclone separator (6), the hot solids storage tank (7), the iron-oxide recycle line (30) to the reactor and the interconnecting piping (21, 33) are heated to temperatures in the range of 350° to 500° C. with air, which is preheated to about 1000° C., and supplied to the equipment through the oxygen and feed materials inlet line (1). Iron oxide particles are fed to and circulated through the system during the initial heat-up to provide the inventory needed for the fluidized bed. When the temperature of the system has reached the 350°–500° C. range, the air is replaced with unheated oxygen and pulverized carbonaceous fuel is fed (from storage vessel 4) into the reactor system where it burns and further heats the equipment and iron oxide particles to the desired operating temperature range of 550° to 800° C. The sodium chloride is fed (from storage vessel 3) to the reactor system to combine with the recirculating iron oxide fluidized-bed particles to form the catalyst. The amount of sodium chloride fed is sufficient to provide a sodium chloride concentration in the range 0.1 to 10%, preferably 0.4 to 1.0%, by weight of the bed particles. At this point, the system is ready for establishing the desired steady-state operating conditions and material flows. The following ranges of operating conditions are suitable.

| | |
|---|---|
| Reactor temperature | 550°–800° C. |
| Reactor inlet pressure | 50–150 psig |
| | (3–7 atm) |
| Ferric chloride feed | 3000–15,000 lb/hr |
| | (1360–6820 kg/hr) |
| Excess oxygen feed | 3–70% |
| Carbonaceous fuel feed | 150–400 lb/hr |
| | (68–180 kg/hr) |
| Sodium chloride feed | 50–300 lb/hr |
| | (23–136 kg/hr) |
| Iron oxide recycle to reactor | 15,000–60,000 lb/hr |
| | (6,800–27,200 kg.hr) |

For these conditions, the conversion of iron chlorides to iron oxide generally exceeds 90%. When the reactor outlet temperature is greater than 600° C., conversions of 95% or more are usually obtained.

The following Examples are presented to illustrate, but not to restrict, the present invention. Unless otherwise stated, all percentages are by weight. In the Examples and the Comparisons presented below, the equipment described above with reference to the drawing was employed, as were the above-described start-up and operating procedures.

EXAMPLE I

The reactor system (51, 52, 53, 54), the first cyclone separator (6), the hot solids storage tank (7), the iron-oxide recycle line (30) to the reactor and the interconnecting piping (21, 33) were preheated to a temperature in the range of 600° to 700° C. Then, the conditions listed in Table I were established and the entire system was run continuously for 15 hours. The run was terminated when the iron chloride storage vessel (2) finally became empty because the feed rate to the reactor exceeded the capability of the equipment used for filling the iron chloride storage vessel.

During the 15-hour run the reactor exit temperature varied narrowly between 700° and 720° C., and the iron oxide recirculation rate was varied from 20,000 to 30,000 pounds per hour (6100 to 9100 kg/hr).

The dry, pulverized carbonaceous fuel employed in this run represented a preferred fuel for use in the process of this invention. The fuel was made from a lignite char, contained 0.7% hydrogen and had a stable ignition temperature of approximately 400° C.

During the 15-hour run, the conversion of iron chloride to iron oxide varied from 90% to above 95%; no undesirable temperature excursions were experienced; complete combustion of the fuel was achieved in a single pass through the reactor system; and the cooling surfaces of the fluid bed condenser remained substantially free of fouling.

EXAMPLE II

In the manner of Example I the operating conditions summarized in Table I were established after a preheating temperature range of 680° to 700° C. had been achieved. The fuel used in this example was prepared from lignite char and had a stable ignition temperature of 400° C. and a hydrogen content of 1.0%. Operating conditions in each reaction zone and percents a conversions of iron chloride to iron oxide are listed in Table I.

EXAMPLE III

The reactor depicted in FIG. 3 having a narrow conduit 55 of 14 cm in diameter and 20 cm long and a larger conduit 56 of 23 cm in diameter and 5.5 m long was utilized. The operating conditions summarized in Table I were established after a preheating temperature range of 660° to 700° C. has been achieved. The fuel used in this example was prepared from activated charcoal and had a stable ignition temperature of about 390° C. and a hydrogen content of about 3.1%. Operating conditions in each reaction zone and percents of conversion of iron chloride to iron oxide are listed in Table I.

TABLE I

| Conversion of Iron Chlorides to Chlorine and Iron Oxide | | | |
|---|---|---|---|
| Operating Conditions | Example 1 | Example 2 | Example 3 |
| Zone 51 exit temperature, °C. | 700–720 | 670–710 | 700 |
| Zone 51 inlet pressure, atm. (gage) | 4.8 | 6.6 | 5.1 |
| Feed rates, kg/hr | | | |
| iron chlorides[1] | 3520 | 5300–5600 | 2540 |
| sodium chloride | 23 | 23 | 50 |
| fuel[2] | 114 | 110 | 200 |
| oxygen | 860 | 1100 | 826 |
| nitrogen[3] | 0–230 | 640 | 420 |
| % excess oxygen[4] | 23 | 13 | 8.5 |
| Iron oxide recirculation, kg/hr | 9060–13640 | 19500 | 10000 |
| Superficial gas velocity, m/s | | | |

TABLE I-continued
Conversion of Iron Chlorides to Chlorine and Iron Oxide

| Operating Conditions | Example 1 | Example 2 | Example 3 |
|---|---|---|---|
| Zone 51 ($V_1$) | 0.4 | 0.5 | 0.4 |
| Zone 52 ($V_2$) | 4.0 | 6.0 | — |
| Zone 53 ($V_3$) | 0.6 | 0.8 | — |
| Zone 54 ($V_4$) | 4.0 | 6.0 | — |
| Zone 55 ($V_5$) | — | — | 12 |
| Zone 56 ($V_6$) | — | — | 4 |
| Pipe 21 | 20.0 | 30.0 | 20.0 |
| Solids volume fraction, S | | | |
| Zone 51 ($S_1$) | 0.4 | 0.4 | 0.4 |
| Zone 52 ($S_2$)[6] | (n.m.) | (n.m.) | — |
| Zone 53 ($S_3$) | 0.01–0.02 | 0.03–0.04 | — |
| Zone 54 ($S_4$) | 0.005 | 0.016–0.018 | — |
| Zone 55 ($S_5$) | — | — | — |
| Zone 56 ($S_6$) | — | — | 0.009–0.017 |
| Pipe 21 | 0.002 | <0.01 | 0.006 |
| % conversion[5] | | | |
| Zone 51 | 80–85 | 84 | 74 |
| Zone 54 | >99 | 98 | — |
| Zone 56 | — | — | — |
| Pipe 21 | — | — | 90 |

Notes
[1] See page 9 for feed composition.
[2] The fuel contains 70% by weight fixed carbon and 0.7% by weight hydrogen, the remainder being primarily ash.
[3] The nitrogen is carried into the system with the feed materials from the nitrogen-pressurized storage vessels.
[4] Percent excess oxygen is the percent in excess of the stoichiometric amount required to convert all iron chlorides to chlorine and iron oxide, all carbon to carbon dioxide and all hydrogen to water.
[5] Percent conversion refers to the total conversion (or iron chlorides to chlorine and iron oxide) achieved by the time the process stream reaches the exit of the specified zone.
[6] This is a calculated average value; in actuality the loading varies very greatly from zero → very high values over very short periods due to "slugging" of entrained solids as they leave Zone 51.

To illustrate the practice of the invention on a variety of apparatus configurations different from those preferred, operating conditions and conversions for four apparatus configurations were calculated. In all cases the reactor vessel 5 is the same as previously described and the solids fractions for the reactor vessel are based on actual experimental measurements. The remainder of the data are calculated on the basis of published correlations by Reddy and Pei, I & EC Fund, Vol. 8, No. 3, August 1969 and Yang, "Estimating the Acceleration Pressure Drop and Particle Acceleration Length in Vertical and Horizontal Pneumatic Transport lines," Proc. Pneumatransport, 3, 1976. The basis for all hypothetical cases are as follows:

| Assumed Conditions | |
|---|---|
| Zone 51, exit temperature, °C. | 600 |
| Zone 51, inlet pressure, atm (gage) | 6.6 |
| Feed rates, kg/hr | |
| iron chlorides | 5770 |
| sodium chloride | 23 |
| fuel | 110 |
| oxygen | 1140 |
| nitrogen | 570 |
| % excess oxygen | 9 |
| Calculated Conditions | |
| Superficial gas velocity, m/sec | |
| Zone 51 ($V_1$) | 0.4 |
| Pipe 21 | 20.0 |
| Solids volume fraction, S | |
| Zone 51 ($S_1$) | 0.4 |
| Pipe 21 | 0.01 |
| Conversion % | |
| Zone 51 | 58 |

For purposes of comparison with the most preferred system described in Example 1, the first calculated case employed the same apparatus configuration. In this case the calculated percent conversion at Zone 52 is 64% Zone 53 is 82%; and Zone 54 is greater than 99.5%.

The second calculated case eliminates Zones 53 and 54 and has only Zone 52 having a diameter of 6 inches (15.2 cm) and length of 12 meters. The calculated conversion at Zone 52 is 73%. The third calculated case is the same as the second except the diameter of Zone 52 is 4 inches (10.2 cm). The calculated conversion at Zone 52 is 65%.

The fourth calculated case is the same as the second except that the diameter of Zone 52 is 7 inches (17.8 cm). The calculated conversion at Zone 52 is 78%.

These calculated cases qualitatively illustrate the advantages of having a transition zone between the dense and dilute reaction zones for high conversions.

What is claimed is:

1. In a process for producing chlorine and iron oxide in a multistage recirculating-fluidized-bed reactor, wherein ferric chloride is treated in the vapor phase with an excess of oxygen at superatmospheric pressure and at a temperature from 550° to 800° C. in the presence of a catalyst made from sodium chloride and iron oxide, a carbonaceous fuel is fed to the reactor to supply supplemental heat, particles of bed material are recirculated to the reactor, and gaseous and solid effluents are separated and recovered downstream of the reactor, the improvement comprising carrying out the process in reaction zones comprising (1) an initial dense zone having a length-to-diameter ratio, $(L/D)_1$, from 2:1 to 4:1, wherein a solids volume fraction, $S_1$, from 0.3 to 0.6 and a superficial gas velocity, $V_1$, in the range of 0.15 to 0.6 meters/second are maintained and wherein the fuel is burned, the recirculated-bed material and reactants are heated, the ferric chloride is vaporized and oxidation of the ferric chloride is initiated, and (2) a downstream dilute zone having a length-to-diameter ratio, $(L/D)_4$, of at least 10:1 wherein a solids volume fraction, $S_4$, from 0.005 to 0.05 and a superficial gas velocity, $V_4$, from 1.5 to 6 meters/second are maintained, which velocity is from 4 to 25 times the superficial gas velocity in the dense zone.

2. The process of claim 1 wherein in the initial dense zone, $(L/D)_1$, is from 3:1 to 4:1, $S_1$ is from 0.36 to 0.48 and $V_1$ is from 0.3 to 0.45 meters/second, and in the downstream dilute zone $S_4$ is from 0.008 and 0.032 and $V_4$ is from 3 to 4.5 meters/second and from 6 to 15 times $V_1$.

3. The process of claim 1 wherein the initial dense zone and the downstream dilute zone are connected by a transition zone wherein the superficial gas velocity is at least 25 times the superficial gas velocity in the initial dense zone.

4. The process of claim 1 wherein the initial dense zone and the downstream dilute zone are connected by a transition zone comprising a second zone wherein the superficial gas velocity, $V_2$, is from 2 to 6 meters/second and a third zone wherein the superficial gas velocity, $V_3$, is from 0.25 to 1.2 meters/second, which velocity is from 1.2 to 3.2 times the superficial gas velocity, $V_1$, of the initial dense zone.

* * * * *